US011982221B2

(12) United States Patent
Yonemura et al.

(10) Patent No.: US 11,982,221 B2
(45) Date of Patent: May 14, 2024

(54) CENTRIFUGAL COMPRESSOR AND TURBOCHARGER

(71) Applicant: IHI Corporation, Tokyo (JP)

(72) Inventors: Atsushi Yonemura, Tokyo (JP); Ryota Sakisaka, Tokyo (JP); Kazuaki Nakamura, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 18/466,118

(22) Filed: Sep. 13, 2023

(65) Prior Publication Data

US 2024/0003289 A1 Jan. 4, 2024

Related U.S. Application Data

(63) Continuation of application No. PCT/JP2022/011013, filed on Mar. 11, 2022.

(30) Foreign Application Priority Data

Jul. 13, 2021 (JP) ................................ 2021-115967

(51) Int. Cl.
*F04D 29/42* (2006.01)
*F02B 37/00* (2006.01)
(Continued)

(52) U.S. Cl.
CPC ............ *F02B 37/004* (2013.01); *F04D 17/10* (2013.01); *F04D 27/0253* (2013.01);
(Continued)

(58) Field of Classification Search
CPC .. F04D 29/4213; F04D 29/464; F04D 29/584; F04D 29/5846; F04D 27/003;
(Continued)

(56) References Cited

U.S. PATENT DOCUMENTS 4,265,589 A * 5/1981 Watson ................ F04D 27/001 415/118
10,570,905 B2 * 2/2020 Mohtar ................ F04D 29/685
(Continued)

FOREIGN PATENT DOCUMENTS

EP 3 530 954 A1 8/2019
JP 2019-167931 A 10/2019
(Continued)

OTHER PUBLICATIONS

International Search Report dated May 24, 2022 in PCT/JP2022/011013 filed on March 11, 2022, 2 pages.

*Primary Examiner* — Justin D Seabe
(74) *Attorney, Agent, or Firm* — Oblon, McClelland, Maier & Neustadt, L.L.P.

(57) ABSTRACT

A centrifugal compressor includes: a housing including an intake flow path; a compressor impeller arranged in the intake flow path; an accommodation chamber formed upstream of the compressor impeller in a flow of intake air in the housing; a movable member arranged in the accommodation chamber; and an annular path formed in the housing, the annular path being connected to an outside of the housing, a heating medium supplied from the outside of the housing flowing through the annular path, at least a part of the annular path being located between the accommodation chamber and a leading edge of the compressor impeller.

9 Claims, 12 Drawing Sheets

(51) Int. Cl.

| | |
|---|---|
| ***F04D 17/10*** | (2006.01) |
| ***F04D 27/02*** | (2006.01) |
| ***F04D 29/46*** | (2006.01) |
| ***F04D 29/58*** | (2006.01) |

(52) U.S. Cl.
CPC ....... *F04D 29/4213* (2013.01); *F04D 29/462* (2013.01); *F04D 29/584* (2013.01)

(58) Field of Classification Search
CPC ...... F04D 27/0253; F04D 27/04; F02D 7/002; F02B 37/00; F05D 2220/40
See application file for complete search history.

(56) References Cited

U.S. PATENT DOCUMENTS

| | | | | |
|---|---|---|---|---|
| 2020/0386242 | A1* | 12/2020 | Arai .................... | F04D 29/4206 |
| 2021/0088054 | A1 | 3/2021 | Sakisaka et al. | |

FOREIGN PATENT DOCUMENTS

| | | | | | |
|---|---|---|---|---|---|
| JP | 6586772 | B2 | 10/2019 | | |
| WO | WO-2012079664 | A1 * | 6/2012 | ............. | F01D 25/14 |
| WO | WO 2019/073584 | A1 | 4/2019 | | |
| WO | WO 2020/031507 | A1 | 2/2020 | | |

* cited by examiner

CENTRIFUGAL COMPRESSOR AND TURBOCHARGER

CROSS REFERENCE TO RELATED APPLICATIONS

This application is a continuation application of International Application No. PCT/JP2022/011013, filed on Mar. 11, 2022, which claims priority to Japanese Patent Application No. 2021-115967 filed on Jul. 13, 2021, the entire contents of which are incorporated herein by reference.

BACKGROUND ART

Technical Field

The present disclosure relates to a centrifugal compressor and a turbocharger.

A centrifugal compressor comprises a compressor housing in which an intake flow path is formed. The compressor impeller is arranged in the intake flow path. When a flow rate of air flowing into the compressor impeller decreases, air compressed by the compressor impeller flows backward in the intake flow path, and causes a phenomenon called surging.

Patent Literature 1 discloses a centrifugal compressor comprising a throttling mechanism in a compressor housing. The throttling mechanism is located upstream of the compressor impeller in a flow of intake air. The throttling mechanism comprises a movable member. The movable member is movable to a protruding position in which the movable member protrudes into the intake flow path, and to a retracted position in which the movable member is retracted from the intake flow path. The throttling mechanism reduces the cross-sectional area of the intake flow path by protruding the movable member into the intake flow path. When the movable member protrudes into the intake flow path, air flowing backward in the intake flow path is blocked by the movable member. By blocking the air flowing backward in the intake flow path, the surging is curbed.

CITATION LIST

Patent Literature

Patent Literature 1: EP 3530954 A1

SUMMARY

Technical Problem

The air compressed by the compressor impeller reaches a high temperature of about 200° C. When such hot air flows backward in the intake flow path and is blocked by the movable member, the movable member reaches a high temperature and its strength is decreased, causing the movable member not to operate normally.

The purpose of the present disclosure is to provide a centrifugal compressor and a turbocharger that can operate a movable member normally.

Solution to Problem

In order to solve the above problem, a centrifugal compressor according to one aspect of the present disclosure includes: a housing including an intake flow path; a compressor impeller arranged in the intake flow path; an accommodation chamber formed upstream of the compressor impeller in a flow of intake air in the housing; a movable member arranged in the accommodation chamber; and an annular path formed in the housing, the annular path being connected to an outside of the housing, a heating medium supplied from the outside of the housing flowing through the annular path, at least a part of the annular path being located between the accommodation chamber and a leading edge of the compressor impeller.

An intake port of the annular path may be positioned vertically below a discharge port of the annular path.

A radially outer end of the annular path may be located radially outside a radially outer end of the accommodation chamber.

A width of the radially outer end of the annular path may be narrower than a width of a radially inner end.

A turbocharger according to one aspect of the present disclosure includes the centrifugal compressor described above.

Effects of Disclosure

According to the present disclosure, the movable member can be operated normally.

DESCRIPTION OF EMBODIMENTS

Embodiments of the present disclosure will be described in detail below with reference to the accompanying drawings. Specific dimensions, materials, and numerical values described in the embodiments are merely examples for a better understanding, and do not limit the present disclosure unless otherwise specified. In this specification and the drawings, duplicate explanations are omitted for elements having substantially the same functions and configurations by assigning the same sign. Furthermore, elements not directly related to the present disclosure are omitted from the figures.

First Embodiment

Figure 1:
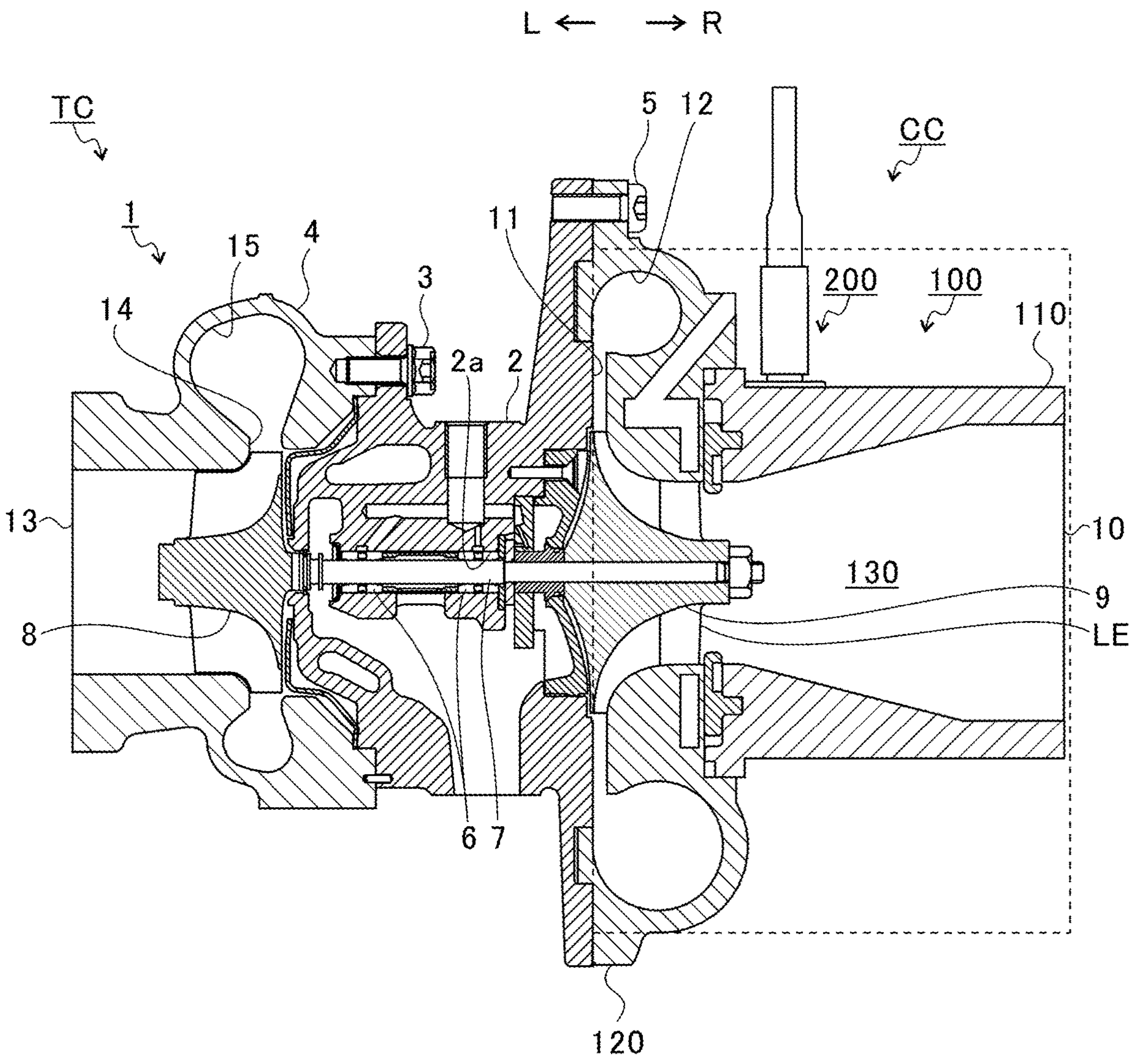
FIG. 1 is a schematic cross-sectional view of a turbocharger according to a first embodiment.

FIG. 1 is a schematic cross-sectional view of a turbocharger TC according to the first embodiment. A direction indicated by arrow L in FIG. 1 is described as a left side of the turbocharger TC. A direction indicated by arrow R in FIG. 1 is described as a right side of the turbocharger TC. A portion including a compressor housing 100 (described later) in the turbocharger TC functions as a centrifugal compressor CC. Hereinafter, the centrifugal compressor CC will be described as being driven by the turbine impeller 8 as described later. However, the centrifugal compressor CC is not limited thereto, and may be driven by an engine (not shown), or may be driven by an electric motor (motor) (not shown). As such, the centrifugal compressor CC may be incorporated into a device other than the turbocharger TC, or may be a stand-alone unit.

As shown in FIG. 1, the turbocharger TC comprises a turbocharger body 1. The turbocharger body 1 includes a bearing housing 2, a turbine housing 4, a compressor housing (housing) 100, and a link mechanism 200. Details of the link mechanism 200 will be described later. The turbine housing 4 is connected to the left side of the bearing housing 2 by fastening bolts 3. The compressor housing 100 is connected to the right side of the bearing housing 2 by fastening bolts 5.

An accommodation hole 2*a* is formed in the bearing housing 2. The accommodation hole 2*a* passes through the bearing housing 2 in the left-to-right direction of the turbocharger TC. A bearing 6 is arranged in the accommodation hole 2*a*. In FIG. 1, a full floating bearing is shown as an example of the bearing 6. However, the bearing 6 may be any other radial bearing, such as a semi-floating bearing or a rolling bearing. A part of a shaft 7 is arranged in the accommodation hole 2*a*. The shaft 7 is rotatably supported by the bearing 6. A turbine impeller 8 is provided at the left end of the shaft 7. The turbine impeller 8 is rotatably housed in the turbine housing 4. A compressor impeller 9 is provided at the right end of the shaft 7. The compressor impeller 9 is rotatably housed in the compressor housing 100. In the present disclosure, a rotational axis direction, a radial direction, a circumferential direction and a rotational direction of the shaft 7, the turbine impeller 8 and the compressor impeller 9 may simply be referred to as the rotational axis direction, the radial direction, the circumferential direction and the rotational direction, respectively.

An inlet 10 is formed in the compressor housing 100. The inlet 10 opens to the right side of the turbocharger TC. The inlet 10 is connected to an air cleaner (not shown). A diffuser flow path 11 is formed between the bearing housing 2 and the compressor housing 100. The diffuser flow path 11 pressurizes air. The diffuser flow path 11 is formed in an annular shape from a radially inner side to an outer side. The diffuser flow path 11 is connected to the inlet 10 via the compressor impeller 9 at a radially inner part.

Furthermore, a compressor scroll flow path 12 is formed in the compressor housing 100. For example, the compressor scroll flow path 12 is located radially outside the compressor impeller 9. The compressor scroll flow path 12 is connected to an intake port of an engine (not shown) and to the diffuser flow path 11. When the compressor impeller 9 rotates, air is sucked into the compressor housing 100 from the inlet 10. The sucked air is pressurized and accelerated while passing through blades of the compressor impeller 9. The pressurized and accelerated air is further pressurized in the diffuser flow path 11 and the compressor scroll flow path 12. The pressurized air flows out from an outlet (not shown) and is directed to the intake port of the engine.

As such, the turbocharger TC comprises the centrifugal compressor CC. The centrifugal compressor CC includes the compressor housing 100, the compressor impeller 9, and the link mechanism 200 described below.

An outlet 13 is formed in the turbine housing 4. The outlet 13 opens to the left side of the turbocharger TC. The outlet 13 is connected to an exhaust gas purifier (not shown). A connecting flow path 14 and a turbine scroll flow path 15 are formed in the turbine housing 4. The turbine scroll flow path 15 is located radially outside the turbine impeller 8. The connecting flow path 14 is located between the turbine impeller 8 and the turbine scroll flow path 15.

The turbine scroll flow path 15 is connected to an gas inlet (not shown). Exhaust gas discharged from an exhaust manifold (not shown) of the engine is directed to the gas inlet. The connecting flow path 14 connects the turbine scroll flow path 15 to the outlet 13. The exhaust gas directed from the gas inlet to the turbine scroll flow path is directed to the outlet 13 through the connecting flow path 14 and blades of the turbine impeller 8. The exhaust gas rotates the turbine impeller 8 while passing therethrough.

A rotational force of the turbine impeller 8 is transmitted to the compressor impeller 9 via the shaft 7. As described above, the air is pressurized by the rotational force of the compressor impeller 9 and directed to the intake port of the engine.

Figure 2:
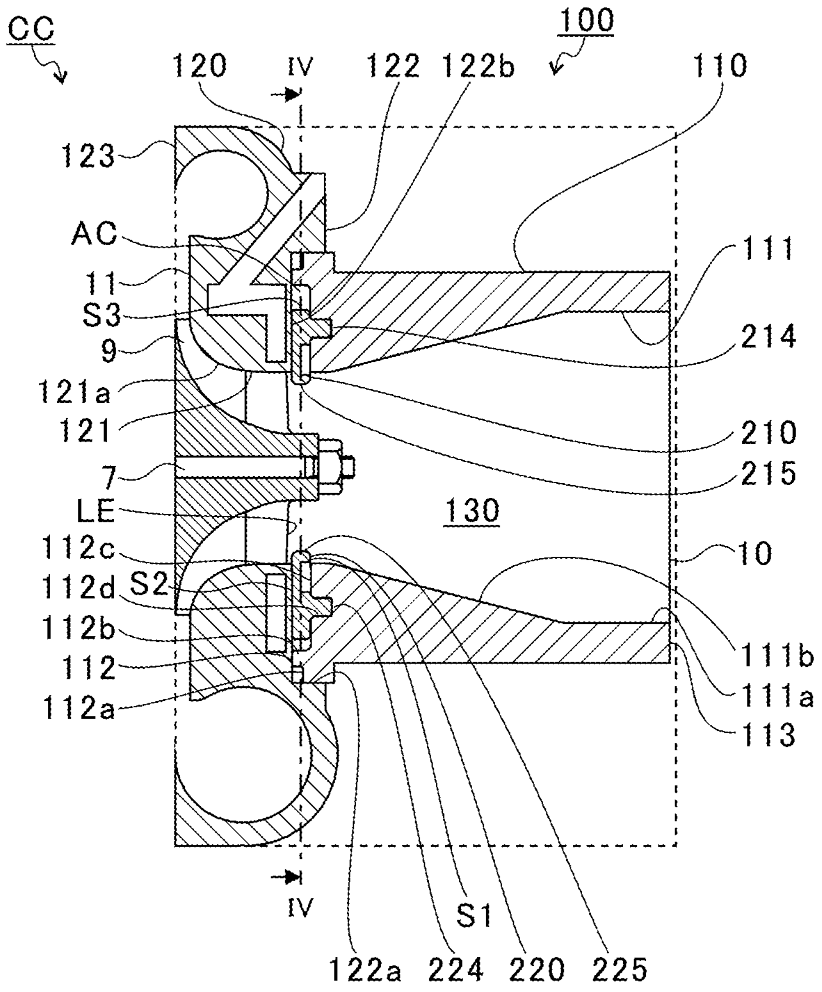
FIG. 2 is an extract of an area enclosed by dashed lines in FIG. 1.

FIG. 2 is an extract of an area enclosed by dashed lines in FIG. 1. As shown in FIG. 2, the compressor housing 100 includes a first housing member 110 and a second housing member 120. The first housing member 110 is located spaced apart from the bearing housing 2 with respect to the second housing member 120. The second housing member 120 is connected to the bearing housing 2. The first housing member 110 is connected to the second housing member 120.

The first housing member 110 has a substantially cylindrical shape. A through hole 111 is formed in the first housing member 110. The first housing member 110 includes an end face 112 on a side proximate (connected) to the second housing member 120. The first housing member 110 also includes an end face 113 on a side spaced apart from the second housing member 120. The inlet 10 is formed on the end face 113. The through hole 111 extends from the end face 112 to the end face 113 along a rotational axis direction. In other words, the through hole 111 passes through the first housing member 110 in the rotational axis direction. The through hole 111 includes the inlet 10 at the end face 113.

The through hole 111 includes a parallel portion 111*a* and a tapered portion 111*b*. The parallel portion 111*a* is located closer to the end face 113 with respect to the tapered portion 111*b*. An inner diameter of the parallel portion 111*a* is substantially constant over the rotational axis direction. The tapered portion 111*b* is located closer to the end face 112 with respect to the parallel portion 111*a*. The tapered portion 111*b* is continuous with the parallel portion 111*a*. An inner diameter of the tapered portion 111*b* at a position continuous with the parallel portion 111*a* is substantially equal to the inner diameter of the parallel portion 111*a*. The inner diameter of the tapered portion 111*b* decreases as being spaced apart from the parallel portion 111*a*. The inner diameter of the tapered portion 111*b* decreases as approaching the end face 112.

A notch 112*a* is formed in the end face 112. The notch 112*a* is recessed from the end face 112 toward the end face 113. The notch 112*a* is formed on an outer periphery of the end face 112. For example, the notch 112*a* has a substantially annular shape when seen from the rotational axis direction.

An accommodation chamber AC is formed on the end face 112. The accommodation chamber AC of the first housing member 110 is formed closer to the inlet 10 with respect to a leading edge LE of the blades of the compressor impeller 9. The accommodation chamber AC is formed by an accommodation groove 112*b*, bearing holes 112*d*, and an accommodation hole 115 (described later).

The accommodation groove 112*b* is formed on the end face 112. The accommodation groove 112*b* is located between the notch 112*a* and the through hole 111. The accommodation groove 112*b* is recessed from the end face 112 toward the end face 113. For example, the accommodation groove 112*b* has a substantially annular shape when seen from the rotational axis direction. The accommodation groove 112*b* is connected to the through hole 111 at a radially inner part.

The bearing holes 112*d* are formed on a wall surface 112*c* parallel to the end face 113 in the accommodation groove 112*b*. The bearing holes 112*d* extend from the wall surface 112*c* toward the end face 113 in the rotational axis direction. Two bearing holes 112*d* are provided spaced apart from each other in the rotational direction. The two bearing holes 112*d* are arranged on positions spaced apart from each other by 180 degrees in the rotational direction.

A through hole 121 is formed in the second housing member 120. The second housing member 120 includes an end face 122 on a side proximate (connected) to the first housing member 110. The second housing member 120 also includes an end face 123 on a side spaced apart from the first housing member 110. In other words, the second housing member 120 includes the end face 123 on the side connected to the bearing housing 2. The through hole 121 extends from the end face 122 to the end face 123 along the rotational axis direction. In other words, the through hole 121 passes through the second housing member 120 in the rotational axis direction.

An inner diameter of the through hole 121 at an end closer to the end face 122 is substantially equal to the inner diameter of an end of the through hole 111 closer to the end face 112. A shroud portion 121*a* is formed on an inner wall of the through hole 121. The shroud portion 121*a* faces the compressor impeller 9 from a radially outer side. An outer diameter of the compressor impeller 9 increases as being spaced apart from the leading edge LE of the blades of the compressor impeller 9. An inner diameter of the shroud portion 121*a* increases as being spaced apart from the end face 122. In other words, the inner diameter of the shroud portion 121*a* increases as approaching the end face 123.

An accommodation groove 122*a* is formed on the end face 122. The accommodation groove 122*a* is recessed from the end face 122 toward the end face 123. For example, the accommodation groove 122*a* has a substantially annular shape when seen from the rotational axis direction. The first housing member 110 is inserted into the accommodation groove 122*a*. The end face 112 of the first housing member 110 contacts a wall surface 122*b* parallel to the end face 123 in the accommodation groove 122*a*. The accommodation chamber AC is formed between the wall surface 112*c* of the first housing member 110 and the wall surface 122*b* of the second housing member 120.

An intake flow path 130 is formed by the through hole 111 of the first housing member 110 and the through hole 121 of the second housing member 120. In other words, the intake flow path 130 is formed in the compressor housing 100. The intake flow path 130 extends from the air cleaner (not shown) to the diffuser flow path 11 via the inlet 10. A side closer to the air cleaner (inlet 10) in the intake flow path 130 is referred to as an upstream side in a flow of the intake air, and a side closer to the diffuser flow path 11 in the intake flow path 130 is referred to as a downstream side in the flow of the intake air.

The compressor impeller 9 is arranged in the intake flow path 130. For example, the intake flow path 130 has a circular shape around the rotational axis of the compressor impeller 9 in a cross-section perpendicular to the rotational axis direction. However, the cross-sectional shape of the intake flow path 130 is not limited thereto, and may be, for example, an elliptical shape.

A seal (not shown) is arranged in the notch 112*a* of the first housing member 110. The seal reduces a flow rate of air flowing in a gap between the first housing member 110 and the second housing member 120. However, the notch 112*a* and the seal are not essential.

Figure 3:
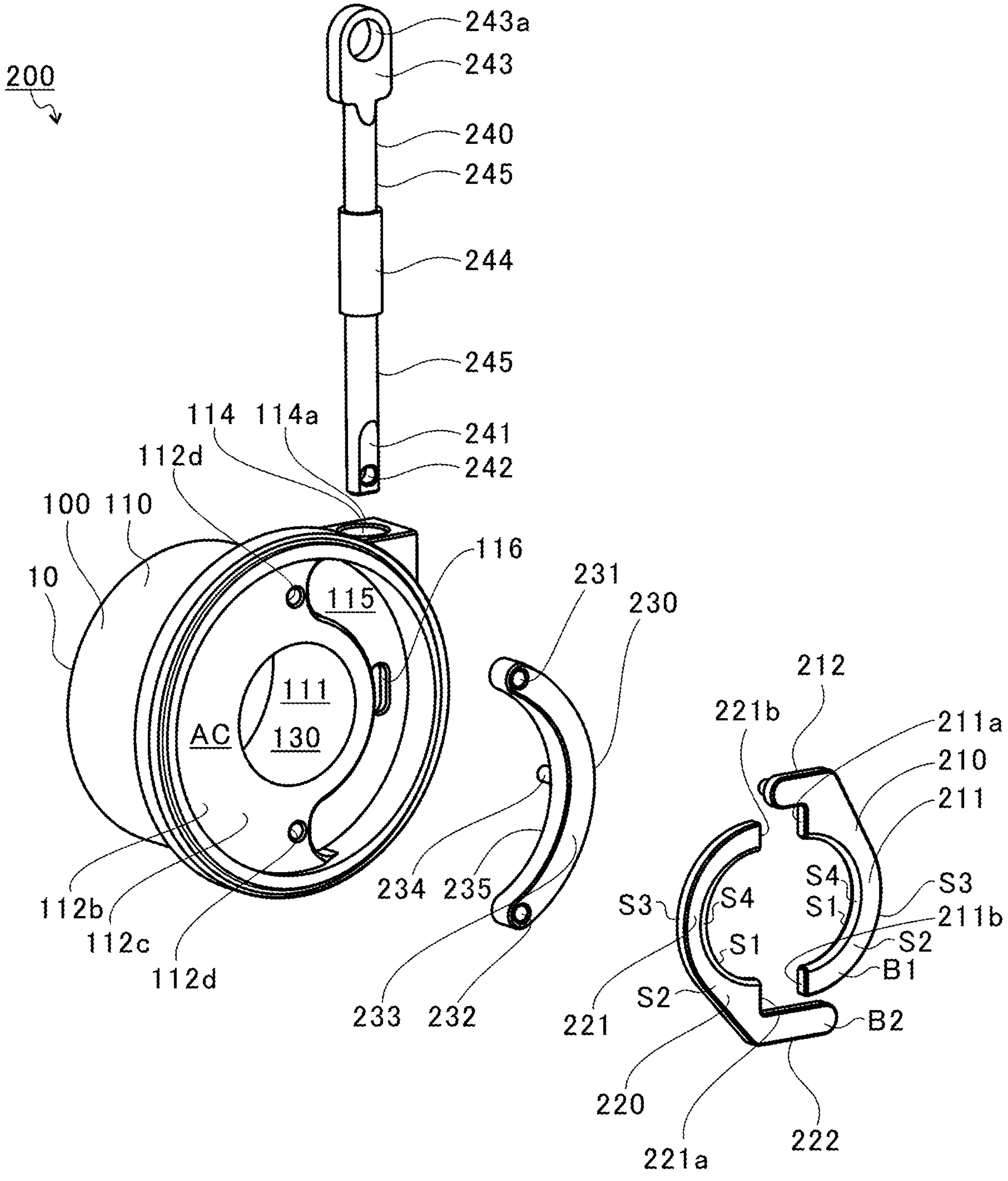
FIG. 3 is an exploded perspective view of components included in a link mechanism.

FIG. 3 is an exploded perspective view of components included in the link mechanism 200. In FIG. 3, only the first housing member 110 of the compressor housing 100 is shown. As shown in FIG. 3, the link mechanism 200 includes the first housing member 110, a first movable member 210, a second movable member 220, a connecting member 230, and a rod 240. Hereinafter, the first movable member 210 and the second movable member 220 may collectively be referred to as the movable members 210 and 220. The link mechanism 200 is arranged closer to the inlet 10 of the intake flow path 130 (upstream side) with respect to the leading edge LE of the blades of the compressor impeller 9 in the rotational axis direction.

The first movable member 210 is arranged in the accommodation groove 112*b* (accommodation chamber AC). Specifically, the first movable member 210 is arranged between the wall surface 112*c* of the accommodation groove 112*b* and the wall surface 122*b* of the accommodation groove 122*a* (see FIG. 2) in the rotational axis direction.

The first movable member 210 includes an upstream surface S1, a downstream surface S2, an outer surface S3, and an inner surface S4. The upstream surface S1 is a surface on the upstream side of the first movable member 210. The intake downstream surface S2 is a surface on the downstream side of the first movable member 210. The outer surface S3 is a radially outer surface of the first movable member 210. The inner surface S4 is a radially inner surface of the first movable member 210.

The first movable member 210 includes a body B1. The body B1 includes a curved portion 211 and an arm 212. The curved portion 211 extends in the circumferential direction. The curved portion 211 has a substantially semi-circular-arc shape. A first end face 211*a* and a second end face 211*b* in the circumferential direction of the curved portion 211 extend parallel to the radial direction and the rotational axis direction. However, the first end face 211*a* and the second end face 211*b* may be inclined with respect to the radial direction and to the rotational axis direction.

The arm 212 is provided on the first end face 211*a* of the curved portion 211. The arm 212 extends radially outward from the outer surface S3 of the curved portion 211. Furthermore, the arm 212 extends in a direction inclined with respect to the radial direction (toward the second movable member 220).

The second movable member 220 is arranged in the accommodation groove 112*b* (accommodation chamber AC). Specifically, the second movable member 220 is arranged between the wall surface 112*c* of the accommodation groove 112*b* and the wall surface 122*b* of the accommodation groove 122*a* (see FIG. 2) in the rotational axis direction.

The second movable member 220 includes an upstream surface S1, a downstream surface S2, an outer surface S3, and an inner surface S4. The upstream surface S1 is a surface on the upstream side of the second movable member 220. The intake downstream surface S2 is a surface on the downstream side of the second movable member 220. The outer surface S3 is a radially outer surface of the second movable member 220. The inner surface S4 is a radially inner surface of the second movable member 220.

The second movable member 220 includes a body B2. The body B2 includes a curved portion 221 and an arm 222. The curved portion 221 extends in a circumferential direction. The curved portion 221 has a substantially semi-circular-arc shape. A first end face 221*a* and a second end face 221*b* of the curved portion 221 in the circumferential direction extend parallel to the radial direction and the rotational axis direction. However, the first end face 221*a* and the second end face 221*b* may be inclined with respect to the radial direction and to the rotational axis direction.

The arm 222 is provided on the first end face 221*a* of the curved portion 221. The arm 222 extends radially outward from the outer surface S3 of the curved portion 221. Furthermore, the arm 222 extends in a direction inclined with respect to the radial direction (toward the first movable member 210).

The curved portion 211 faces the curved portion 221 across a center of rotation of the compressor impeller 9 (intake flow path 130). The first end face 211*a* of the curved portion 211 circumferentially faces the second end face 221*b* of the curved portion 221. The second end face 211*b* of the curved portion 211 circumferentially faces the first end face 221*a* of the curved portion 221. The movable members 210 and 220 are configured so that the curved portions 211 and 221 are movable in the radial direction, as described later in detail.

The connecting member 230 is connected to the movable members 210 and 220. The connecting member 230 is located closer to the inlet 10 with respect to the first movable member 210 and the second movable member 220. The connecting member 230 has a substantially arc shape. A first bearing hole 231 is formed at one end of the connecting member 230 in the circumferential direction, and a second bearing hole 232 is formed at the other end. In the connecting member 230, the first bearing hole 231 and the second bearing hole 232 are opened on an end face 233 closer to the movable members 210 and 220. The first bearing hole 231 and the second bearing hole 232 extend in the rotational axis direction. In the present embodiment, the first bearing hole 231 and the second bearing hole 232 are non-through holes. However, the first bearing hole 231 and the second bearing hole 232 may pass through the connecting member 230 in the rotational axis direction.

A rod connector 234 is formed in the connecting member 230 between the first bearing hole 231 and the second bearing hole 232. In the connecting member 230, the rod connector 234 is formed on an end face 235 opposite to the movable members 210 and 220. The rod connector 234 protrudes from the end face 235 in the rotational axis direction. For example, the rod connector 234 has a substantially cylindrical shape.

The rod 240 has a substantially cylindrical shape. A flat portion 241 is formed at one end of the rod 240 and a connecting portion 243 is formed at the other end. The flat portion 241 extends in a plane direction substantially perpendicular to the rotational axis direction. A bearing hole 242 is opened on the flat portion 241. The bearing hole 242 extends in the rotational axis direction. The connecting portion 243 includes a connecting hole 243*a*. The connecting hole 243*a* is connected to the actuator 250 (see FIG. 5) described later. For example, the bearing hole 242 may be an elongated hole whose length in a direction perpendicular to the rotational axis direction and to an axial direction of the rod 240 is longer than its length in the axial direction of the rod 240.

A rod large diameter portion 244 and two rod small diameter portions 245 are formed on the rod 240 between the flat portion 241 and the connecting portion 243. The rod large diameter portion 244 is arranged between the two rod small diameter portions 245. The rod small diameter portion 245 closer to the flat portion 241 of the two rod small diameter portions 245 connects the rod large diameter portion 244 to the flat portion 241. The rod small diameter portion 245 closer to the connecting portion 243 of the two rod small diameter portions 245 connects the rod large diameter portion 244 to the connecting portion 243. An outer diameter of the rod large diameter portion 244 is larger than outer diameters of the two rod small diameter portions 245.

An insertion hole 114 is formed in the first housing member 110. One end 114*a* of the insertion hole 114 opens to the outside of the first housing member 110. For example, the insertion hole 114 extends in a plane direction perpendicular to the rotational axis direction. The insertion hole 114 is located radially outside the intake flow path 130. A side including the flat portion 241 of the rod 240 is inserted into the insertion hole 114. The rod large diameter portion 244 is guided by an inner wall of the insertion hole 114. The rod 240 is prevented from moving except in the central axial direction of the insertion hole 114 (the central axial direction of the rod 240).

An accommodation hole 115 is formed in the first housing member 110. The accommodation hole 115 is opened on the wall surface 112*c* of the accommodation groove 112*b*. The accommodation hole 115 is recessed from the wall surface 112*c* toward the inlet 10. The accommodation hole 115 is located spaced apart from the inlet 10 (closer to the second housing member 120) with respect to the insertion hole 114. The accommodation hole 115 has a substantially arc shape when seen from the rotational axis direction. The accommodation hole 115 extends longer than the connecting member 230 in the circumferential direction. The accommodation hole 115 is circumferentially spaced apart from the bearing holes 112*d*.

A communication hole 116 is formed in the first housing member 110. The communication hole 116 connects the insertion hole 114 to the accommodation hole 115. The communication hole 116 is formed substantially in the middle of the accommodation hole 115 in the circumferential direction. The communication hole 116 is, for example, an elongated hole extending substantially parallel to the extending direction of the insertion hole 114. In the communication hole 116, a width in the longitudinal direction (extending direction) is greater than a width in the lateral direction (direction perpendicular to the extending direction). A width of the insertion hole 114 in the lateral direction is greater than an outer diameter of the rod connector 234 of the connecting member 230.

The connecting member 230 is accommodated in the accommodation hole 115 (accommodation chamber AC). As such, the first movable member 210, the second movable member 220, and the connecting member 230 are arranged in the accommodation chamber AC formed in the first housing member 110. The accommodation hole 115 is circumferentially longer and radially larger than the connecting member 230. Accordingly, the connecting member 230 is allowed to move within the accommodation hole 115 in the plane direction perpendicular to the rotational axis direction.

The rod connector 234 is inserted through the communication hole 116 into the insertion hole 114. The flat portion 241 of the rod 240 is inserted into the insertion hole 114. The bearing hole 242 of the flat portion 241 faces the communication hole 116. The rod connector 234 is inserted into the bearing hole 242, and connected to the rod 240. The rod connector 234 is supported by the bearing hole 242.

Figure 4:
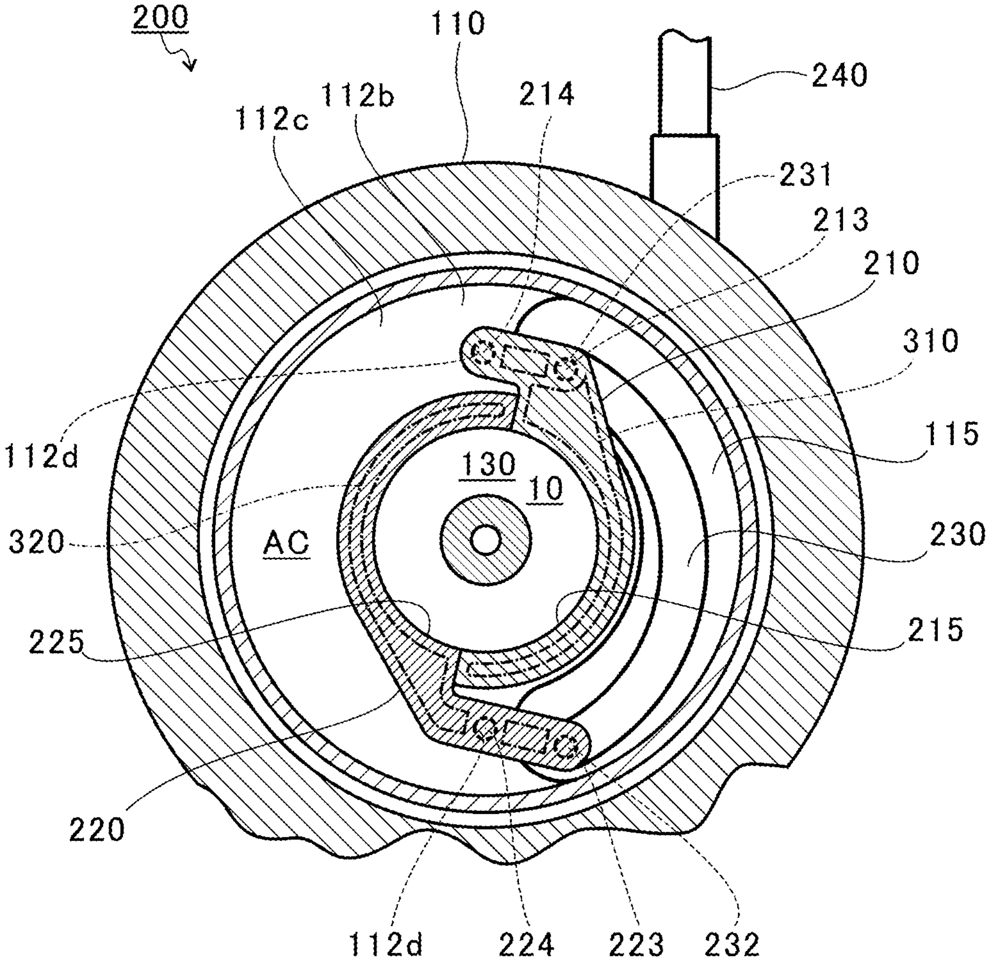
FIG. 4 is a cross-sectional view taken along line IV-IV in FIG. 2.

FIG. 4 is a cross-sectional view taken along line IV-IV in FIG. 2. As shown in dashed lines in FIG. 4, the first movable member 210 includes a connecting shaft 213 and a rotational shaft 214. In the first movable member 210, the connecting shaft 213 and the rotational shaft 214 protrude in the rotational axis direction from the upstream surface S1 (see FIG. 2) that faces the wall surface 112*c*. The connecting shaft 213 and the rotational shaft 214 extend toward the back side in FIG. 4. The rotational shaft 214 extends parallel to the connecting shaft 213. The connecting shaft 213 and rotational shaft 214 have a substantially cylindrical shape.

An outer diameter of the connecting shaft 213 is smaller than an inner diameter of the first bearing hole 231 of the connecting member 230. The connecting shaft 213 is inserted into the first bearing hole 231. The connecting shaft 213 is rotatably supported by the first bearing hole 231. An outer diameter of the rotational shaft 214 is smaller than an inner diameter of the bearing hole 112*d* of the first housing member 110. The rotational shaft 214 is inserted into the bearing hole 112*d* on the vertically upper side (closer to the rod 240) of the two bearing holes 112*d*. The rotational shaft 214 is rotatably supported by the bearing hole 112*d*.

The second movable member 220 includes a connecting shaft 223 and a rotational shaft 224. In the second movable member 220, the connecting shaft 223 and the rotational shaft 224 protrude in the rotational axis direction from the upstream surface S1 (see FIG. 2) that faces the wall surface 112*c*. The connecting shaft 223 and the rotational shaft 224 extend toward the back side in FIG. 4. The rotational shaft 224 extends parallel to the connecting shaft 223. The connecting shaft 223 and the rotational shaft 224 have a substantially cylindrical shape.

An outer diameter of the connecting shaft 223 is smaller than an inner diameter of the second bearing hole 232 of the connecting member 230. The connecting shaft 223 is inserted into the second bearing hole 232. The connecting shaft 223 is rotatably supported by the second bearing hole 232. An outer diameter of the rotational shaft 224 is smaller than the inner diameter of the bearing hole 112*d* of the first housing member 110. The rotational shaft 224 is inserted into the bearing hole 112*d* on the vertically lower side (spaced apart from the rod 240) of the two bearing holes 112*d*. The rotational shaft 224 is rotatably supported by the bearing hole 112*d*.

A groove 310 recessed toward the downstream surface S2 is formed on the upstream surface S1 of the first movable member 210. Furthermore, a groove 320 recessed toward the downstream surface S2 is formed on the upstream surface S1 of the second movable member 220.

As described above, the link mechanism 200 includes a four-bar linkage. The four links (nodes) are the first movable member 210, the second movable member 220, the first housing member 110, and the connecting portion 230. Since the link mechanism 200 includes the four-bar linkage, it is a limited chain, has one degree of freedom, and is easy to control.

Figure 5:
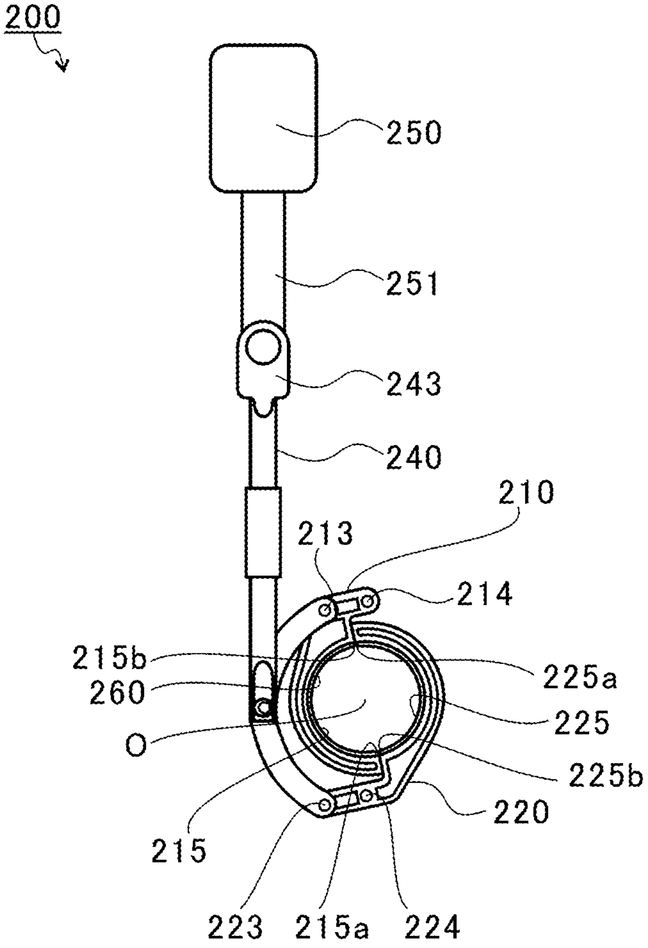
FIG. 5 is a first illustration of an operation of the link mechanism.

FIG. 5 is a first illustration of an operation of the link mechanism 200. In the following FIGS. 5, 6 and 7, the link mechanism 200 is seen from the inlet 10. As shown in FIG. 5, an end of a drive shaft 251 of an actuator 250 is connected to the connecting portion 243 of the rod 240.

In the arrangement shown in FIG. 5, the first movable member 210 and the second movable member 220 are in contact with each other. In this situation, as shown in FIGS. 2 and 4, a protruding portion 215 that is a radially inner part of the first movable member 210 protrudes into the intake flow path 130. A protruding portion 225 that is a radially inner part of the second movable member 220 protrudes into the intake flow path 130. The positions of the first movable member 210 and the second movable member 220 in this situation are referred to as a protruding position (or a throttling position).

As shown in FIG. 5, in the protruding position, ends 215*a* and 215*b* of the protruding portion 215 in the circumferential direction contact ends 225*a* and 225*b* of the protruding portion 225 in the circumferential direction, respectively. The protruding portions 215 and 225 form an annular hole 260. An inner diameter of the annular hole 260 is smaller than the inner diameter of the intake flow path 130 at a position where the protruding portions 215 and 225 protrude. For example, the inner diameter of the annular hole 260 is smaller than the inner diameter of the intake flow path 130 at any positions.

Figure 6:
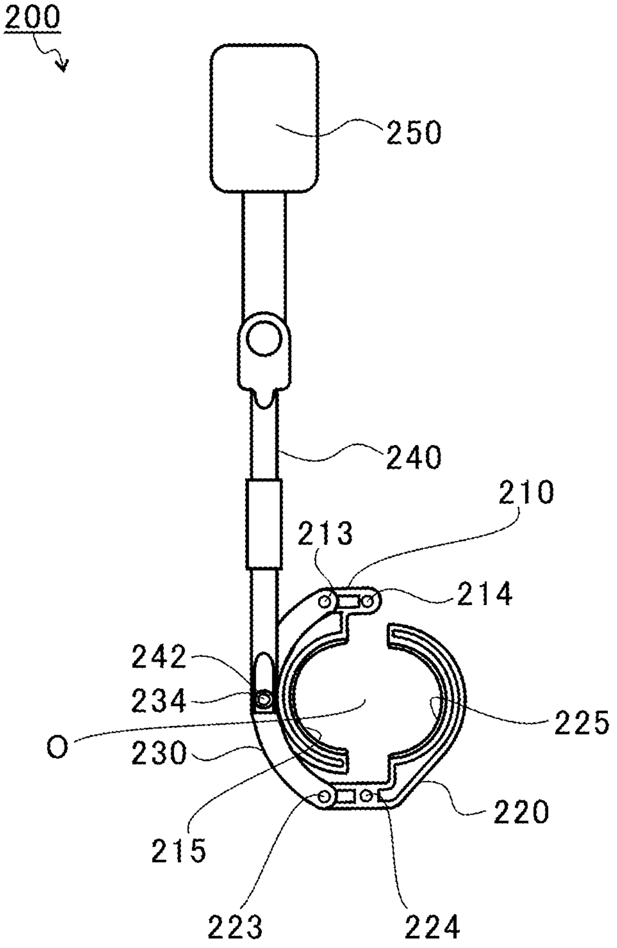
FIG. 6 is a second illustration of the operation of the link mechanism.
Figure 7:
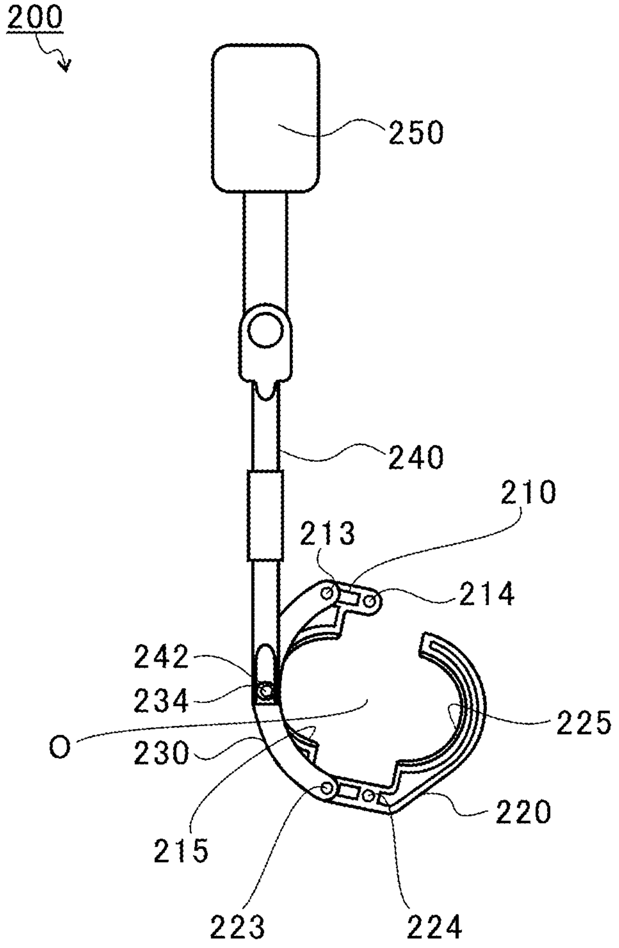
FIG. 7 is a third illustration of the operation of the link mechanism.

FIG. 6 is a second illustration of the operation of the link mechanism 200. FIG. 7 is a third illustration of the operation of the link mechanism 200. The actuator 250 linearly moves the rod 240 in a direction that intersects the rotational axis direction (up-and-down direction in FIGS. 6 and 7). In FIGS. 6 and 7, the rod 240 moves upward from the position shown in FIG. 5. With regard to an amount of movement from the arrangement shown in FIG. 5, the arrangement shown in FIG. 7 is larger than the arrangement shown in FIG. 6.

As the rod 240 moves, the connecting member 230 moves upward in FIGS. 6 and 7 via the rod connector 234. In this situation, the connecting member 230 is allowed to rotate around the rod connector 234. Furthermore, there is a slight play between the inner diameter of the bearing hole 242 of the rod 240 and the outer diameter of the rod connector 234. Accordingly, the connecting member 230 is allowed to slightly move in the plane direction perpendicular to the rotational axis direction.

As described above, the link mechanism 200 is the four-bar linkage. The connecting member 230 and the movable members 210 and 220 exhibit a behavior of one degree of freedom with respect to the first housing member 110. Specifically, the connecting member 230 slightly moves in the left-to-right direction while slightly rotating counterclockwise in FIGS. 6 and 7 within the allowable range described above.

The rotational shaft 214 of the first movable member 210 is supported by the first housing member 110. The rotational shaft 214 is prevented from moving in the plane direction perpendicular to the rotational axis direction. The connecting shaft 213 is supported by the connecting member 230. Since the connecting member 230 is allowed to move, the connecting shaft 213 is movable in the plane direction perpendicular to the rotational axis direction. As a result, as the connecting member 230 moves, the first movable member 210 rotates in a clockwise direction in FIGS. 6 and 7 around the rotational shaft 214.

Similarly, the rotational shaft 224 of the second movable member 220 is supported by the first housing member 110.

The rotational shaft 224 is prevented from moving in the plane direction perpendicular to the rotational axis direction. The connecting shaft 223 is supported by the connecting member 230. Since the connecting member 230 is allowed to move, the connecting shaft 223 is movable in the plane direction perpendicular to the rotational axis direction. As a result, as the connecting member 230 moves, the second movable member 220 rotates in a clockwise direction in FIGS. 6 and 7 around the rotational shaft 224.

As such, the first movable member 210 and the second movable member 220 move in directions spaced apart from each other in the order of FIG. 6 to FIG. 7. The protruding portions 215 and 225 move radially outward from the protruding position, and are arranged in a retracted position. In the retracted position, for example, the protruding portions 215 and 225 are flush with an inner wall surface of the intake flow path 130 or are located radially outside the inner wall surface of the intake flow path 130. When moving from the retracted position to the protruding position, the first movable member 210 and the second movable member 220 approach and contact each other in the order of FIG. 7 to FIG. 5. As such, the movable members 210 and 220 switch between the protruding position and the retracted position according to the rotational angle around the rotational shafts 214 and 224.

The movable members 210 and 220 are configured to be movable to the protruding position in which the movable members protrude into the intake flow path 130, and to the retracted position in which the movable members do not protrude into the intake flow path 130. In the present embodiment, the movable members 210 and 220 move in the radial direction. However, the movable members 210 and 220 are not limited thereto, and may rotate around the rotational axis (circumferential direction). For example, the movable members 210 and 220 may be shutter blades having two or more blades.

The movable members 210 and 220 do not protrude into the intake flow path 130 when in the retracted position, thus reducing pressure loss of the air flowing in the intake flow path 130.

As shown in FIG. 2, the movable members 210 and 220 are arranged so that, in the protruding position, the protruding portions 215 and 225 are located in the intake flow path 130. When the movable members 210 and 220 are in the protruding position, the cross-sectional area of the intake flow path 130 is decreased.

As a flow rate of air flowing into the compressor impeller 9 decreases, the air compressed by the compressor impeller 9 may flow backward in the intake flow path 130. In other words, the air compressed by the compressor impeller 9 may flow from the downstream side to the upstream side in the intake flow path 130.

As shown in FIG. 2, when the movable members 210 and 220 are in the protruding position, the protruding portions 215 and 225 are located radially inside with respect to the radially outermost end of the leading edge LE of the blades of the compressor impeller 9. As a result, the air flowing backward in the intake flow path 130 is blocked by the protruding portions 215 and 225. Accordingly, the movable members 210 and 220 can curb the backflow of air in the intake flow path 130.

In addition, since the cross-sectional area of the intake flow path 130 is decreased, velocity of the air flowing into the compressor impeller 9 increases, and occurrence of surging can be curbed. In other words, the centrifugal compressor CC of the first embodiment can expand an operational area of the centrifugal compressor CC to a smaller flow rate area by arranging the movable members 210 and 220 in the protruding position.

As such, the movable members 210 and 220 are configured as throttles that throttle the intake flow path 130. In other words, in the present embodiment, the link mechanism 200 is configured as a throttling mechanism that throttles the intake flow path 130. The movable members 210 and 220 can change the cross-sectional area of the intake flow path 130 when the link mechanism 200 is driven.

The centrifugal compressor CC may be installed in a vehicle located in a cold region. If the centrifugal compressor CC is installed in a vehicle located in a cold region, the movable members 210 and 220 may freeze and fail to operate normally when the engine is started.

Furthermore, the movable members 210 and 220 may be made of resin material to reduce weight. The air compressed by the compressor impeller 9 reaches high temperature of about 200° C. When such hot air flows backward in the intake flow path 130 and is blocked by the movable members 210 and 220, the movable members 210 and 220 reaches high temperature and the strength of the movable members 210 and 220 are decreased, causing the movable members 210 and 220 not to work normally.

Therefore, the centrifugal compressor CC comprises a heating medium flow path 400 in the compressor housing 100. The heating medium flow path 400 is explained in detail below using FIGS. 8 and 9.

Figure 8:
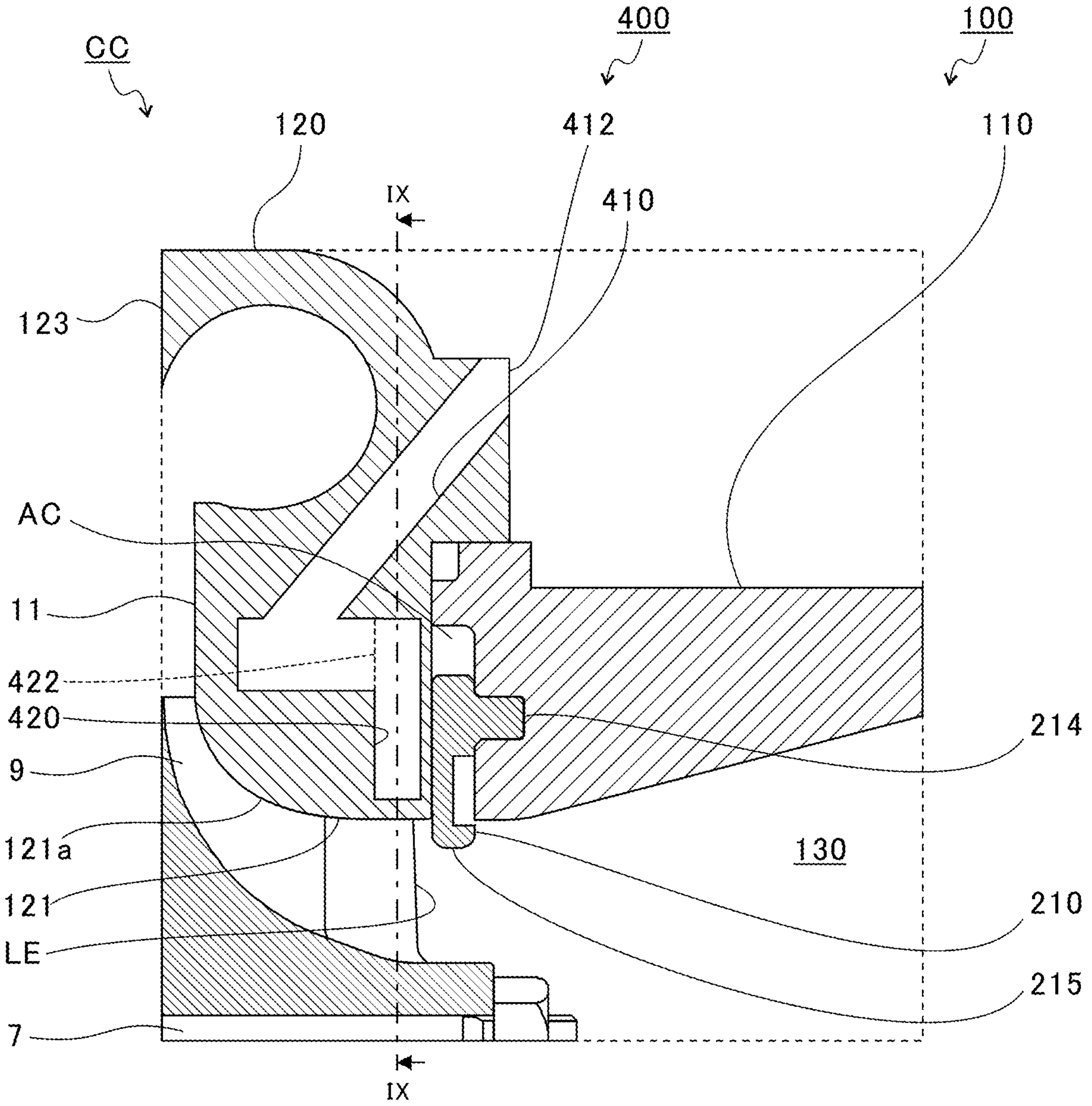
FIG. 8 is a schematic cross-sectional view of a heating medium flow path according to the first embodiment.
Figure 9:
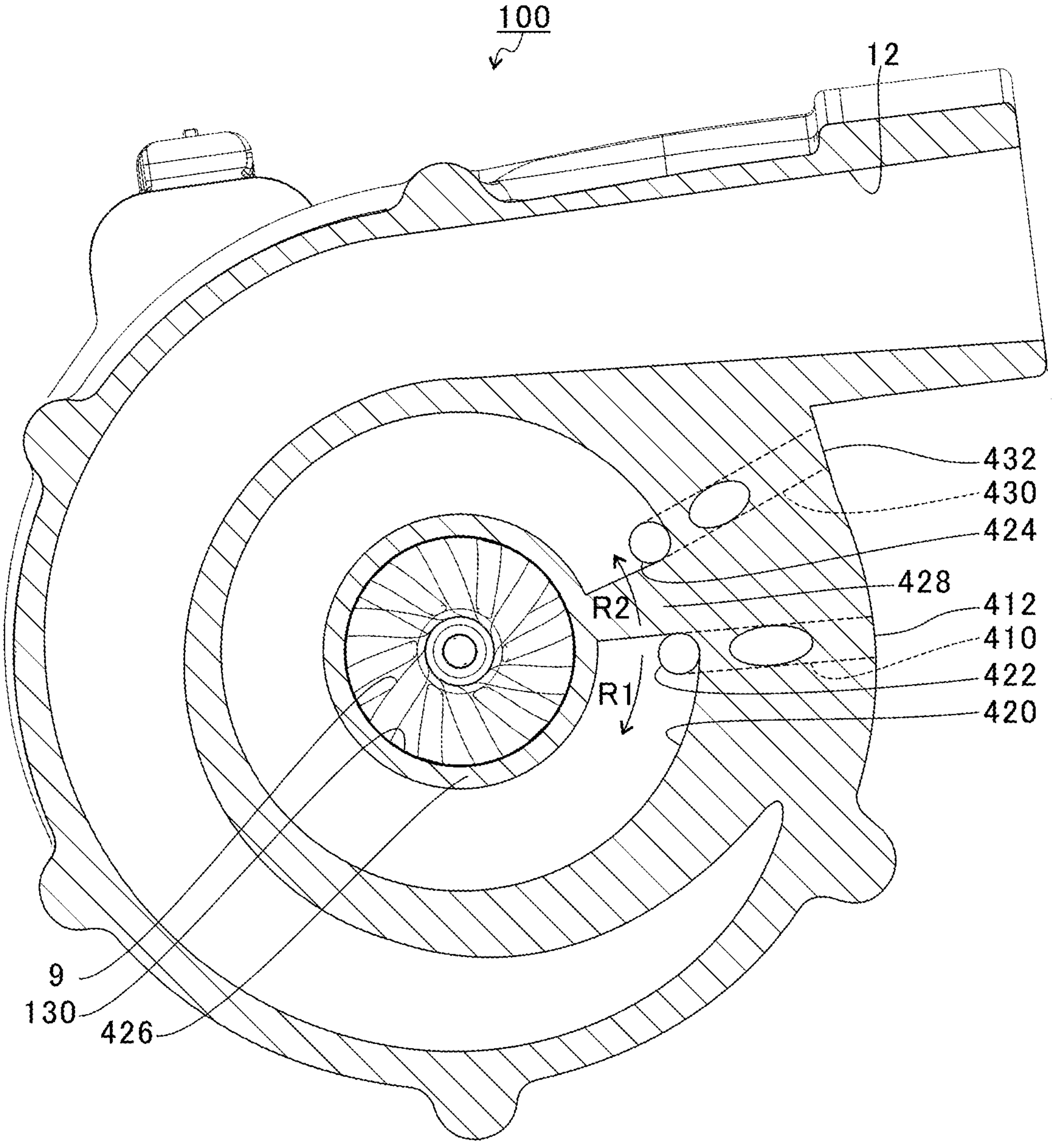
FIG. 9 is a cross-sectional view taken along line IX-IX in FIG. 8.

FIG. 8 is a schematic cross-sectional view of the heating medium flow path 400 according to the first embodiment. FIG. 9 is a cross-sectional view taken along line IX-IX in FIG. 8. As shown in FIGS. 8 and 9, the heating medium flow path 400 includes an intake path 410, an annular path 420, and a discharge path 430.

The intake path 410 includes an intake opening 412. The intake opening 412 opens to the outside of the compressor housing 100 and is connected to a circulation flow path (not shown). One end of the circulation flow path is connected to the intake path 410, and the other end is connected to the discharge path 430.

The circulation flow path is provided with a heat exchanger and a pump (not shown). The circulation flow path circulates a heating medium in the order of the intake path 410, the annular path 420, the discharge path 430, and the circulation flow path. The pump is turned ON when a pressure ratio before and after compression of air in the centrifugal compressor CC is equal to or above a threshold value, and is turned OFF when the pressure ratio is below the threshold value. Furthermore, the pump is turned ON when a temperature of the link mechanism 200 is below a predetermined value, and turned OFF when the temperature is equal to or above the predetermined value.

The heating medium is introduced into the intake opening 412 from the circulation flow path. The heating medium is, for example, engine coolant, water, oil, etc. The intake path 410 connects the circulation flow path to the annular path 420. The intake path 410 directs the heating medium introduced from the intake opening 412 to an intake port 422 of the annular path 420.

As shown in FIG. 8, the annular path 420 is spaced apart from the accommodation chamber AC in the rotational axis direction. In other words, the annular path 420 is not connected to the accommodation chamber AC. At least a part of the annular path 420 is located between the leading edge LE and the accommodation chamber AC in the rotational axis direction. Furthermore, a radially outer end of the annular path 420 is equal to a radially outer end of the accommodation chamber AC, or is located radially outside the radially outer end of the accommodation chamber AC. The radially outer end of the annular path 420 is located radially outside the positions of the movable members 210 and 220 that are accommodated in the accommodating chamber AC.

As shown in FIG. 9, the annular path 420 includes the intake port 422 and a discharge port 424. The intake port 422 of the annular path 420 is located vertically below the discharge port 424 of the annular path 420. In other words, the discharge port 424 of the annular path 420 is located vertically above the intake port 422 of the annular path 420. FIG. 9 shows a positional relationship of the intake path 410, the annular path 420, the intake port 422, the discharge port 424, and the discharge path 430 when the turbocharger TC is in use. Thus, when the turbocharger TC is in use, the intake port 422 is located vertically below the discharge port 424.

The intake port 422 connects the intake path 410 to the annular path 420. The intake port 422 introduces the heating medium passing through the intake path 410 into the annular path 420. The intake port 422 is located on a radially outer part of the annular path 420 and is continuous with an outer circumferential surface of the annular path 420 in the rotational axis direction.

The annular path 420 is formed around the intake flow path 130, and extends in an arc shape in a first direction R1 from the intake port 422 to the discharge port 424 along the circumferential direction. The annular path 420 has a constant radial width. However, the radial width of the annular path 420 is not limited thereto, and may vary along the circumferential direction. A dividing wall 426 is formed between the annular path 420 and the intake flow path 130, and the annular path 420 is radially separated from the intake flow path 130.

The annular path 420 is formed in a C shape, and a dividing wall 428 is formed between the intake port 422 and the discharge port 424 in a second direction R2 that is opposite to the first direction R1. Accordingly, the annular path 420 is discontinuous from the intake port 422 to the discharge port 424 in the second direction R2.

The annular path 420 leads the heating medium introduced from the intake port 422 along the first direction R1 from the intake port 422 to the discharge port 424. The discharge port 424 connects the annular path 420 to the discharge path 430. The discharge port 424 introduces the heating medium passing through the annular path 420 into the discharge path 430. The discharge port 424 is located on a radially outer part of the annular path 420 and is continuous with the outer circumferential surface of the annular path 420 in the rotational axis direction.

The discharge path 430 includes a discharge opening 432. The discharge opening 432 opens to the outside of the compressor housing 100, and is connected to the unshown circulation flow path. The discharge path 430 connects the annular path 420 to the circulation flow path. The discharge path 430 directs the heating medium introduced from the discharge port 424 to the discharge opening 432. The discharge opening 432 discharges the heating medium passing through the discharge path 430 into the circulation flow path.

As described above, the heating medium flow path 400 is connected to the circulation flow path that is provided on the outside of the compressor housing 100. The heating medium supplied from the circulation flow path on the outside of the compressor housing 100 passes through the heating medium flow path 400. At least a part of the annular path 420 is disposed between the leading edge LE and the accommodation chamber AC in the rotational axis direction.

As a result, even when the centrifugal compressor CC is installed in a vehicle located in a cold region and the movable members 210 and 220 are frozen when the engine is started, the heating medium passing through the vicinity of the accommodation chamber AC can warm the movable members 210 and 220. Accordingly, it is possible to unfreeze the movable members 210 and 220 and allow the movable members 210 and 220 to operate normally.

Furthermore, even when the high-temperature compressed air flowing backward in the intake flow path 130 is blocked by the movable members 210 and 220, the movable members 210 and 220 can be cooled by the heating medium passing through the vicinity of the accommodation chamber AC. Accordingly, the movable members 210 and 220 can be prevented from reaching high-temperature, and decrease of the strength of the movable members 210 and 220 can be prevented. As a result, the movable members 210 and 220 can operate normally.

Generally, fluid moving circumferentially in an annular flow path moves from a radially inner part to a radially outer part due to centrifugal force. Accordingly, a space without fluid on the radially inner part is likely to be formed in the annular flow path.

When the intake port 422 is vertically below the discharge port 424, the heating medium from the intake port 422 to the discharge port 424 moves in the annular path 420 at least in the direction opposite to the direction of gravity. This makes it easier for the heating medium to fill the radially inner part of the annular path 420 and makes it difficult to form a space where no heating medium exists on the radially inner part of the annular path 420. As a result, especially the movable members 210 and 220 located on a radially inner part of the accommodation chamber AC can be effectively heated or cooled.

Furthermore, the radially outer end of the annular path 420 is located radially outside the radially outer end of the accommodation chamber AC. This allows heating or cooling of the entire accommodation chamber AC including the radially outer end of the accommodation chamber AC.

Second Embodiment

Figure 10:
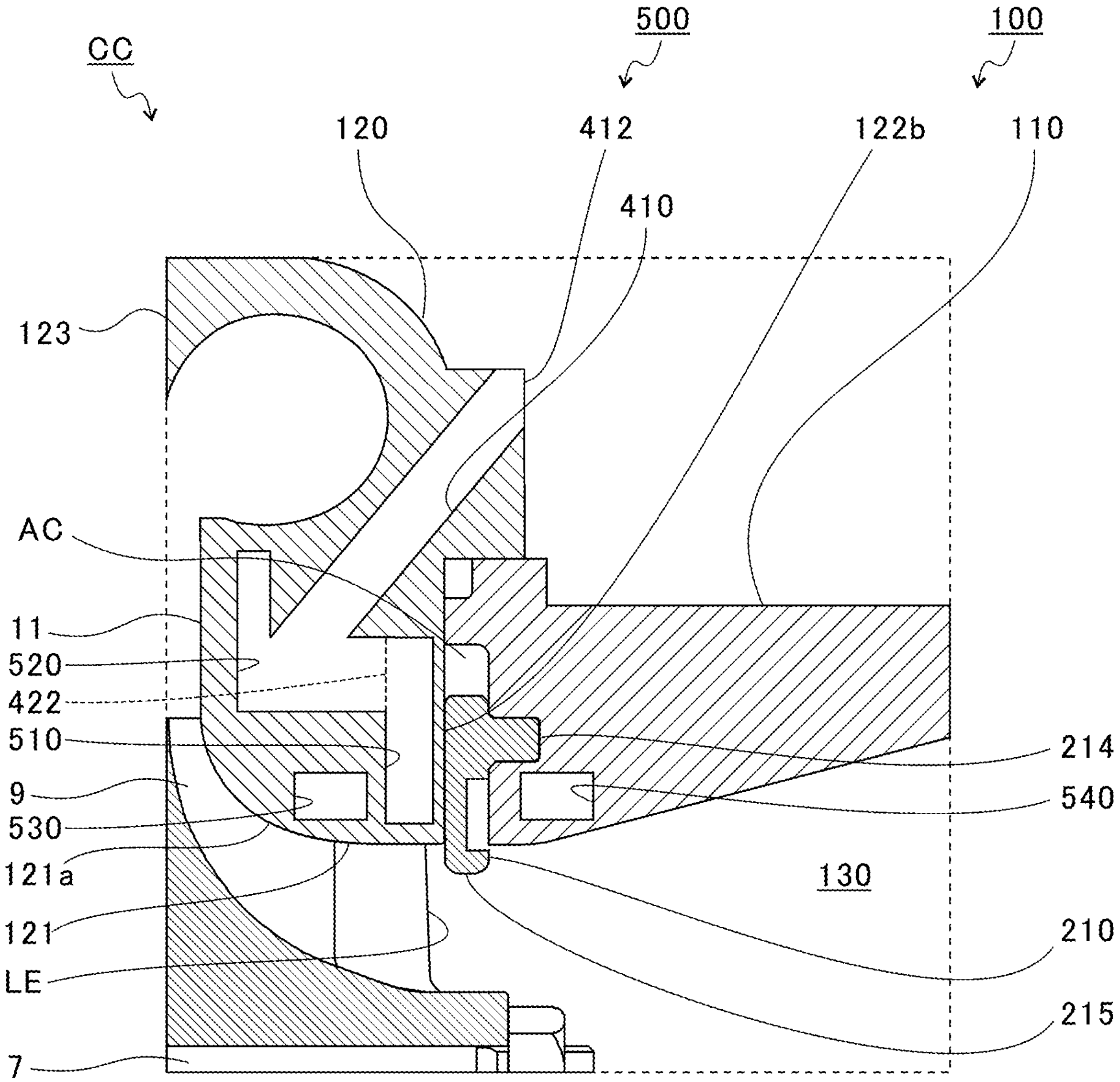
FIG. 10 is a schematic cross-sectional view of the heating medium flow path according to the second embodiment.

FIG. 10 is a schematic cross-sectional view of a heating medium flow path 500 according to the second embodiment. Components that are substantially equivalent to those of the centrifugal compressor CC of the first embodiment described above are marked with the same reference signs, and explanations thereof will be omitted. The heating medium flow path 500 of the second embodiment differs from that of the first embodiment described above in that it includes a first annular path 510, a second annular path 520, a third annular path 530, and a fourth annular path 540. The configuration of the first annular path 510 is the same as that of the annular path 420 of the above first embodiment, and therefore detailed descriptions thereof will be omitted.

As shown in FIG. 10, the first annular path 510 is separated from the accommodation chamber AC in the rotational axis direction. In other words, the first annular path 510 is not connected to the accommodation chamber AC. At least a part of the first annular path 510 is disposed between the leading edge LE and the accommodation chamber AC in the rotational axis direction. Furthermore, the radially outer end of the first annular path 510 is equal to the radially outer end of the accommodation chamber AC, or is located radially outside the radially outer end of the accommodation chamber AC. The radially outer end of the first annular path 510 is located radially outside the positions of the movable members 210 and 220 accommodated in the accommodation chamber AC.

The second annular path 520 is connected to the intake path 410. The second annular path 520 is arranged opposite to the first annular path 510 with respect to the intake path 410. The first annular path 510 and the second annular path 520 are arranged across the intake path 410. The second annular path 520 is located closer to the diffuser flow path 11 with respect to the first annular path 510 and the intake path 410. The second annular path 520 is separated from the diffuser flow path 11 in the rotational axis direction. The second annular path 520 is arranged opposite to the diffuser flow path 11 in the rotational axis direction.

The third annular path 530 is not connected to the intake path 410, the discharge path 430, the first annular path 510, and the second annular path 520, and is supplied with a heating medium by an intake path (not shown) different from the intake path 410. Furthermore, the third annular path 530 discharges the heating medium by a discharge path (not shown) different from the discharge path 430. The third annular path 530 is located closer to the diffuser flow path 11 with respect to the first annular path 510. The third annular path 530 is located closer to the accommodation chamber AC with respect to the second annular path 520. The third annular path 530 is arranged between the first annular path 510 and the second annular path 520. The third annular path 530 is arranged closer to a center of tip ends of the blades of the compressor impeller 9 with respect to the first annular path 510 and the second annular path 520.

The fourth annular path 540 is not connected to the intake path 410, the discharge path 430, the first annular path 510, and the second annular path 520, and is supplied with a heating medium by an intake path (not shown) different from the intake path 410. Furthermore, the fourth annular path 540 discharges the heating medium by a discharge path (not shown) different from the discharge path 430. The fourth annular path 540 is located opposite to the first annular path 510 with respect to the accommodation chamber AC. The accommodation chamber AC is arranged between the first annular path 510 and the fourth annular path 540. In other words, the first annular path 510 and the fourth annular path 540 are arranged on both sides of the accommodation chamber AC in the rotational axis direction. Each of the second annular path 520, the third annular path 530, and the fourth annular path 540 is formed in a C shape around the intake flow path 130 and extends in an arc shape in the first direction R1 from an inlet to an outlet along the circumferential direction, as similar to the annular path 420 shown in FIG. 9.

According to the second embodiment, the heating medium flow path 500 includes the second annular path 520, the third annular path 530, and the fourth annular path 540. The second annular path 520 can cool the compressed air flowing in the diffuser flow path 11. Furthermore, heat transferred from the diffuser flow path 11 to the accommodation chamber AC through the compressor housing 100 can be shut out.

The third annular path 530, together with the first annular path 510, can cool the air flowing backward along the shroud portion 121*a*. Furthermore, the fourth annular path 540 can heat or cool the movable members 210 and 220 from both sides.

Third Embodiment

Figure 11:
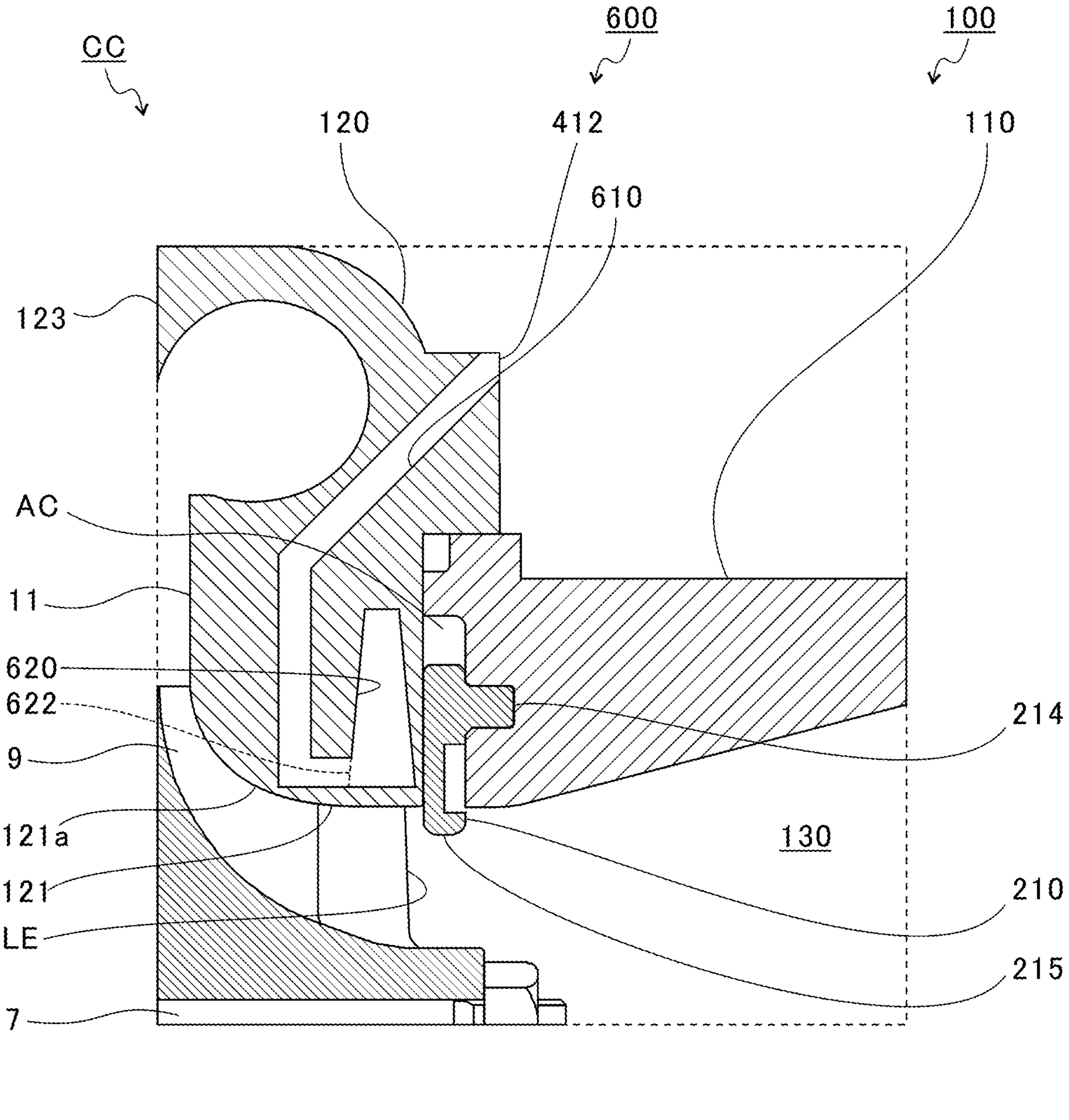
FIG. 11 is a schematic cross-sectional view of the heating medium flow path according to the third embodiment.

FIG. 11 is a schematic cross-sectional view of a heating medium flow path 600 according to the third embodiment. Components that are substantially equivalent to those of the centrifugal compressor CC of the first embodiment described above are marked with the same reference signs, and explanations thereof will be omitted. The heating medium flow path 600 of the third embodiment differs from that of the first embodiment described above in the shape of the intake path 410, the annular path 420, and the discharge path 430.

As shown in FIG. 11, the heating medium flow path 600 includes an intake path 610, an annular path 620, and a discharge path 630. The intake path 610 directs the heating medium from the intake opening 412 to an intake port 622 of the annular path 620. The intake port 622 is located on a radially inner part of the annular path 620 and is continuous with an inner circumferential surface of the annular path 620 in the rotational axis direction.

The annular path 620 is separated from the accommodation chamber AC in the rotational axis direction. In other words, the annular path 620 is not connected to the accommodation chamber AC. At least a part of the annular path 620 is located between the leading edge LE and the accommodation chamber AC in the rotational axis direction. Furthermore, the radially outer end of the annular path 620 is equal to the radially outer end of the accommodation chamber AC, or is located radially outside the radially outer end of the accommodation chamber AC. The radially outer end of the annular path 620 is located radially outside the positions of the movable members 210 and 220 that are accommodated in the accommodation chamber AC.

The annular path 620 has a trapezoidal shape in a cross-section along the rotational axis direction. However, the annular path 620 is not limited thereto, and may have a triangular or semicircular shape in the cross-section along the rotational axis direction. A width of a radially outer end of the annular path 620 is narrower than a width of a radially inner end. In other words, the width of the radially inner end of the annular path 620 is wider than the width of the radially outer end. The annular path 620 is formed in a C shape around the intake flow path 130 and extends in an arc shape in the first direction R1 from the intake port 622 to the discharge port 624 along the circumferential direction, as similar to the annular path 420 shown in FIG. 9.

Figure 12:
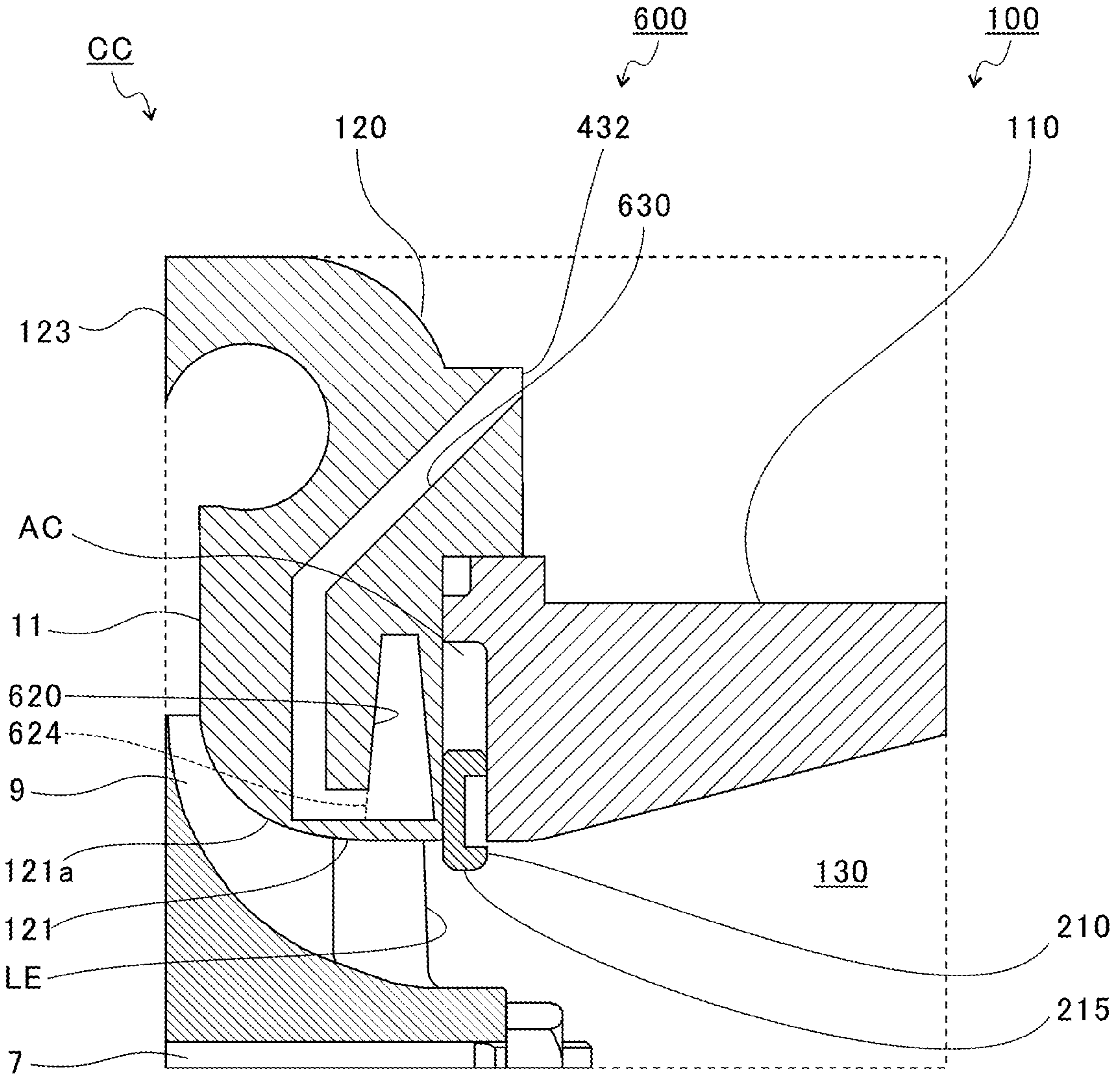
FIG. 12 is a schematic cross-sectional view of a discharge path according to the third embodiment.

FIG. 12 is a schematic cross-sectional view of the discharge path 630 according to the third embodiment. The discharge path 630 directs the heating medium from the discharge port 624 of the annular path 620 to the discharge opening 432. The discharge port 624 is located on a radially inner part of the annular path 620 and is continuous with an inner circumferential surface of the annular path 620 in the rotational axis direction. The configuration of the discharge path 630 is similar to that of the intake path 610, and therefore detailed descriptions thereof will be omitted.

According to the third embodiment, the intake port 622 and the discharge port 624 are located on the radially inner part of the annular path 620, and are continuous with the inner circumferential surface of the annular path 620 in the rotational axis direction. Furthermore, the width of the radially outer end of the annular path 620 is narrower than the width of the radially inner end. This allows more heating medium to be supplied to the radially inner part of the annular path 620 compared to the radially outer part, thereby ensuring the amount of heating medium required for cooling the radially inner part of the accommodation chamber AC even when centrifugal force acts on the heating medium.

Although the embodiments of the present disclosure have been described above with reference to the accompanying drawings, the present disclosure is not limited thereto. It is obvious that a person skilled in the art can conceive of various examples of variations or modifications within the scope of the claims, which are also understood to belong to the technical scope of the present disclosure.

For example, the configurations of the first, second, and third embodiments described above may be combined.

The above first embodiment describes an example in which the intake port 422 of the annular path 420 is positioned vertically below the discharge port 424. However, the intake port 422 is not limited thereto, and may be positioned vertically above the discharge port 424.

The above first embodiment describes an example in which the radially outer end of the annular path 420 is located radially outside the radially outer end of the accommodation chamber AC. However, the radially outer end of the annular path 420 is not limited thereto, and may be positioned radially inside the radially outer end of the accommodation chamber AC.

The above third embodiment describes an example in which the width of the radially outer end of the annular path 620 is narrower than the width of the radially inner end. However, the width of the radially outer end of the annular path 620 is not limited thereto, and may be wider than the width of the radially inner end.

What is claimed is:

1. A centrifugal compressor comprising:

a housing including an intake flow path;

a compressor impeller arranged in the intake flow path;

an accommodation chamber formed upstream of the compressor impeller in a flow of intake air in the housing;

a movable member arranged in the accommodation chamber; and an annular path formed in the housing, the annular path being connected to an outside of the housing, a heating medium supplied from the outside of the housing flowing through the annular path, at least a part of the annular path being located between the accommodation chamber and a leading edge of the compressor impeller.

2. The centrifugal compressor according to claim 1, wherein an intake port of the annular path is positioned vertically below a discharge port of the annular path.

3. The centrifugal compressor according to claim 1, wherein a radially outer end of the annular path is located radially outside a radially outer end of the accommodation chamber.

4. The centrifugal compressor according to claim 2, wherein a radially outer end of the annular path is located radially outside a radially outer end of the accommodation chamber.

5. The centrifugal compressor according to claim 1, wherein a width of the radially outer end of the annular path is narrower than a width of a radially inner end.

6. The centrifugal compressor according to claim 2, wherein a width of the radially outer end of the annular path is narrower than a width of a radially inner end.

7. The centrifugal compressor according to claim 3, wherein a width of the radially outer end of the annular path is narrower than a width of a radially inner end.

8. The centrifugal compressor according to claim 4, wherein a width of the radially outer end of the annular path is narrower than a width of a radially inner end.

9. A turbocharger comprising a centrifugal compressor according to claim 1.

* * * * *